L. V. LEWIS.
AUTOMOTIVE BRAKE EQUIPMENT.
APPLICATION FILED DEC. 14, 1921.
1,438,317.
Patented Dec. 12, 1922.
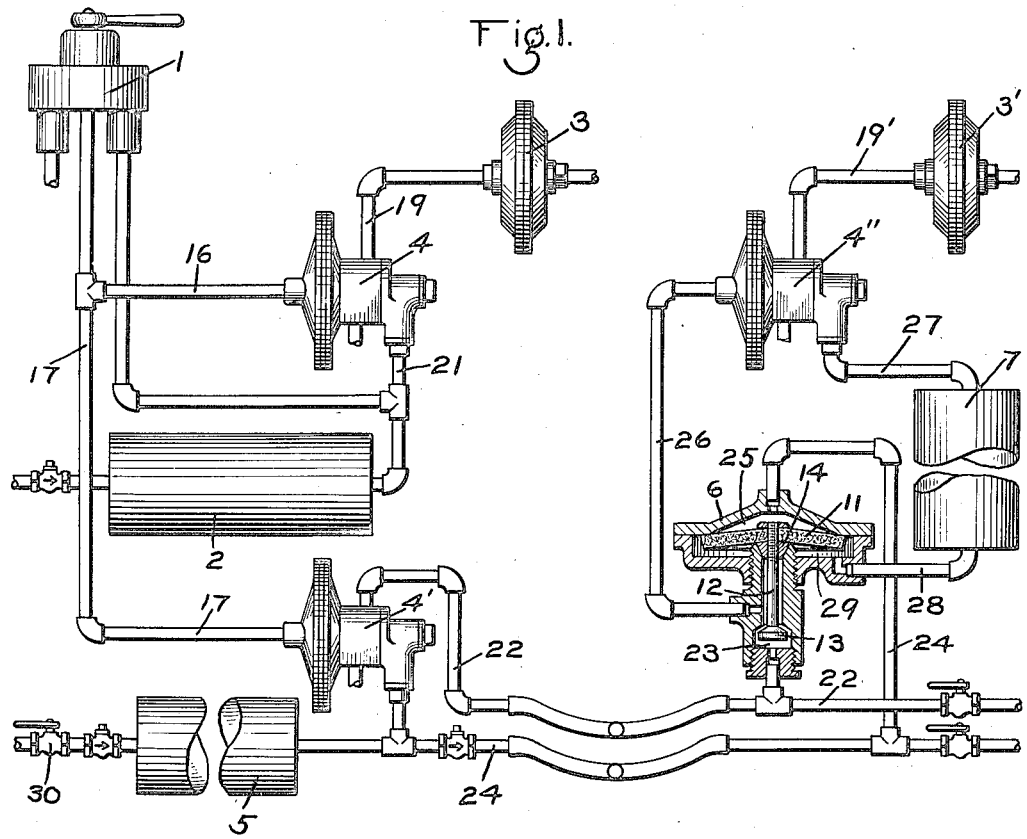
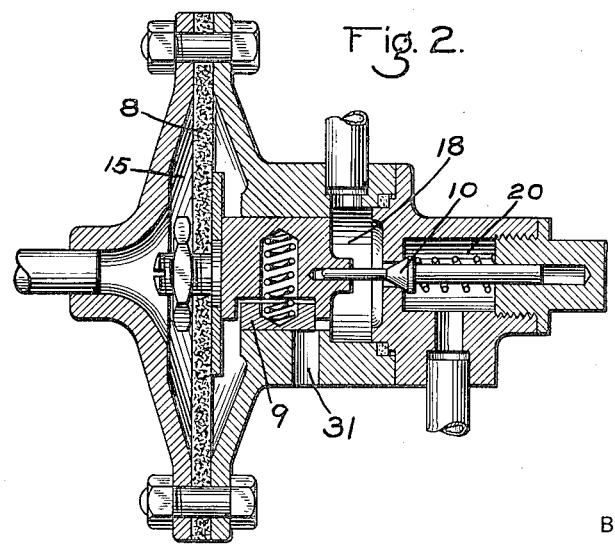
INVENTOR
LLOYD V. LEWIS
BY *Wm. M. Cady*
ATTORNEY Patented Dec. 12, 1922.

1,438,317

UNITED STATES PATENT OFFICE.

LLOYD V. LEWIS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE EQUIPMENT.

Application filed December 14, 1921. Serial No. 522,281.

*To all whom it may concern:*

Be it known that I, LLOYD V. LEWIS, a citizen of the United States, residing at Edgewood, in the county of Allegheny and State of Pennsylvania, have invented new and useful Improvements in Automotive Brake Equipments, of which the following is a specification.

This invention relates to fluid pressure brakes, and more particularly to a fluid pressure brake equipment adapted for use on automotive vehicles.

One object of my invention is to provide means for securing the quick application and release of the brakes.

Another object of my invention is to provide a fluid pressure brake equipment for controlling the brakes on trucks and trailers.

Other objects and advantages will appear in the following more detailed description of the invention.

In the accompanying drawings Fig. 1 is a diagrammatic view of a truck and trailer fluid pressure brake equipment embodying my invention, and Fig. 2 a central sectional view of the quick application and release valve device.

For single car operation, the equipment required, in accordance with my invention, comprises a brake valve device 1, a main reservoir 2, adapted to be charged with fluid under pressure from any desired source, a brake cylinder 3, and a quick application and release valve device 4. In addition, for trailer control, the truck or power vehicle is provided with a trailer main reservoir 5, adapted to be charged with fluid under pressure and a trailer application and release valve device 4'. The trailer brake equipment comprises a quick application and release valve device 4", a brake cylinder 3', an emergency valve device 6, and an auxiliary reservoir 7.

As shown in Fig. 2 of the drawing, the quick application and release valve device for both truck and trailer may comprise a casing containing a flexible diaphragm 8, a release slide valve 9, and an application poppet valve 10, adapted to be operated by the movement of the diaphragm 8. The emergency valve device 6 may comprise a casing containing a flexible diaphragm 11 having a valve stem 12 provided with valves 13 and 14.

On the truck, the diaphragm chamber 15 of the quick application and release valve device 4 is connected by a pipe 16 with a straight air application and release pipe 17 leading to the brake valve device 1, the slide valve chamber 18 is connected by pipe 19 with brake cylinder 3 and valve chamber 20 is connected by pipe 21 to the main reservoir 2. The valve chamber 18 of the quick application and release valve device 4' is connected by a straight air application and release pipe 22, having the usual flexible hose and coupling, with the valve chamber 23 of the emergency valve device 6 on the trailer. The diaphragm chamber 15 is connected to the pipe 17, and the valve chamber 20 to an emergency pipe 24, having the usual flexible hose and coupling connection, and leading to the diaphragm chamber 25 of the emergency valve device 6, the trailer main reservoir 5 being also connected to the emergency pipe 24.

On the trailer, the valve chamber 18 of the quick application and release valve device 4" is connected by pipe 19' with brake cylinder 3', the diaphragm chamber 15 to a pipe 26, leading to the space intermediate the valves 13 and 14 of the emergency valve device 6, and the valve chamber 20 to a pipe 27, leading to the auxiliary reservoir 7. The auxiliary reservoir 7 is also connected by pipe 28 with diaphragm chamber 29 of the emergency valve device 6.

The brake valve device 1 may be of any desired type adapted to control the admission and release of fluid under pressure to and from the application and release pipe 17, but preferably a brake valve is employed of the type disclosed in the pending application of George S. Lane, Serial No. 448,884, filed March 1, 1921.

In operation on a single motor vehicle not connected to a trailer, when the brake valve device 1 is in release position, connecting pipe 16 to the atmosphere, the quick application and release valve device 4 will be in the position shown in Fig. 2 of the drawing, in which the application valve 10 is seated, and the release valve 9 partly uncovers the exhaust port 31, so that the valve chamber 18 and consequently the brake cylinder 3 is connected to the atmosphere. To apply the brakes, fluid under pressure is supplied to the pipe 16 and diaphragm chamber 15 by moving the brake valve to application position. The diaphragm 8 then moves the release valve 9 to close the exhaust port 31 and upon a further movement, the application valve 10 is unseated, so that fluid is supplied from the main reservoir 2 and valve chamber 20 to valve chamber 18 and thence through pipe 19 to brake cylinder 3. When the pressure in the valve chamber 18, which acts on the diaphragm 8, slightly exceeds the pressure in diaphragm chamber 15, the diaphragm will move to the left, so as to permit the valve 10 to seat, but not sufficiently to open the release valve 9, and evidently the pressure in the valve chamber will then be substantially equal to that in the diaphragm chamber 15.

If any leakage from the brake cylinder should occur while the brakes are applied, the higher pressure in diaphragm chamber 15 will cause the diaphragm to move to the right and slightly open the valve 10, so as to compensate for leakage and maintain the brake cylinder pressure equal to the pressure supplied to diaphragm chamber 15.

If the pressure in pipe 16 is reduced by manipulation of the brake valve, the diaphragm 8 will be moved to the left, causing the release valve 9 to uncover the exhaust port 31, thereby releasing fluid from the brake cylinder corresponding with the reduction in pressure in pipe 16.

It will now be evident that the quick application and release valve device acts as a relay valve, requiring for operation only a small volume of fluid under pressure to pass through the brake valve device, while the quick application and release valve device acts promptly to rapidly supply a large volume of fluid under pressure to or release same from the brake cylinder, at the same time maintaining the pressure in the brake cylinder in case of leakage.

Where trailers are being operated, it is desirable, in case of a break-in-two, that the trailer brakes should be applied automatically with maximum pressure to hold the trailer wherever it may be. On the other hand, an automatic application of the brakes on the truck or power vehicle is not desirable and might, in some cases, be a positive source of danger, as, for example, when crossing railway tracks or in case of congested traffic. Under such circumstances the driver should retain full control of the truck and the truck brakes.

According to my invention, for trailer car operation, the truck is equipped with an additional supply reservoir 5 and an additional quick application and release valve device 4' which is controlled in multiple with the truck application valve device 4 and operates to supply fluid from the reservoir 5 through to trailer straight air pipe 22.

The emergency valve device 6 on the trailer may be similar to that disclosed in the pending application of George S. Lane, Serial No. 465,936, filed April 30, 1921, the reservoir 7 being charged from the reservoir pipe line 24 by the flexing of diaphragm 11 when the pressure in chamber 25 as supplied from pipe 24, exceeds the pressure in the reservoir 7.

When the driver on the truck operates the brake valve device 1 to effect an application of the brakes, fluid under pressure is supplied to the diaphragm chamber 15 of both application and release valves 4 and 4'. The brakes are then applied on the truck by operation of the valve device 4, as hereinbefore described, while the similar operation of the valve device 4' effects the admission of fluid under pressure from the reservoir 5 to the trailer straight air pipe 22. From pipe 22, fluid flows past the normally open valve 13 of the emergency valve device 6 to pipe 26 and thence to diaphragm chamber 15 of the valve chamber 4''. The last mentioned valve device is then operated to supply fluid under pressure from the reservoir 7 through pipe 27 to pipe 19' and thence to the trailer brake cylinder 3'.

It will thus be seen that the brake valve device is only required to supply fluid to the two quick application valve devices 4 and 4', one valve device operating to control the supply of fluid to the truck brake cylinder and the other to the quick application valve device 4'' on the trailer.

In case of a break-in-two, the opening of the reservoir pipe line 24 causes a reduction in pressure in the diaphragm chamber 25 of the emergency valve device, so that the diaphragm operates to open the valve 14 and close the valve 13. Fluid under pressure is then supplied from the reservoir 7 past the open valve 14 to pipe 26 and thence to the diaphragm chamber 15 of the valve device 4'', operating the diaphragm 8 of the valve device 4'' to open the valve 10 and admit fluid from reservoir 7 to the brake cylinder 3'.

The reservoir 7 is preferably of relatively small volume so as to avoid producing an excessive brake cylinder pressure under this condition. If the truck should be operated separately, it is not necessary to cut off the straight air pipe or the reservoir pipe line. All that is necessary is a cut out cock 30 placed in the supply line to the reservoir 5, so that the pressure to the reservoir may be cut off when operating without a trailer. The elimination of angle cocks in the straight air pipe and the reservoir pipe line prevents the possibility of the system becoming inoperative due to a closed angle cock.

The equipment may be applied to operate a train including two or more trailers, as the quantity of air to be handled through the brake valve is not affected, the fluid pressure for the trailer brakes being obtained from the local auxiliary reservoir on each trailer and the fluid for operating the quick application valves on the trailers being obtained from the reservoir 5.

Having now described my invention, what I claim as new and desire to secure by Letters Patent, is:—

1. In a motor vehicle brake equipment, the combination with a straight air pipe, a valve device operated upon an increase in pressure in the straight air pipe for applying the brakes on one vehicle, of a train line leading from said vehicle to another vehicle, and a valve device operated upon an increase in pressure in the straight air pipe for supplying fluid to said train line.

2. In a motor vehicle brake equipment, the combination with a straight air pipe on one vehicle, of a straight air train line leading from said vehicle to another vehicle and separate valve devices on the first vehicle operated by variations in pressure in the straight air pipe, one for controlling the brakes on the first vehicle and the other for controlling the admission and release of fluid under pressure to and from the straight air train line.

3. In a motor vehicle and trailer brake, the combination on the motor vehicle with a straight air pipe, a brake cylinder, and a straight air application and release valve device operated by variations in pressure in the straight air pipe for supplying and releasing fluid to and from the brake cylinder, of a straight air train line connecting the motor vehicle with the trailer and a second straight air application and release valve device on the motor vehicle operated by variations in pressure in the straight air pipe for supplying and releasing fluid to and from the straight air train line.

4. In a motor vehicle and trailer brake, the combination with a motor vehicle brake equipment comprising a brake cylinder, a straight air pipe, a valve device operated upon an increase in pressure in the straight air pipe for supplying fluid to the brake cylinder, a straight air train line leading to the trailer, and a valve device operated upon an increase in pressure in the straight air pipe for supplying fluid to the straight air train line, of a trailer brake equipment comprising a brake cylinder and a valve device operated upon an increase in pressure in the straight air train line for supplying fluid to the trailer brake cylinder.

5. In a motor vehicle and trailer brake, the combination with a source of fluid under pressure, a straight air pipe, a brake cylinder, and a valve device operated upon an increase in pressure in the straight air pipe for supplying fluid from said source to the brake cylinder, of a second source of fluid under pressure, a straight air train line leading to the trailer and a second valve device operated upon an increase in pressure in the straight air pipe for supplying fluid to the straight air train line.

6. In a motor vehicle and trailer brake, the combination with a motor vehicle brake equipment comprising a source of fluid under pressure, a straight air pipe, a brake cylinder, a valve device operated upon an increase in pressure in the straight air pipe for supplying fluid to the brake cylinder, a second source of fluid under pressure, a straight air train line leading to the trailer, and a second valve device operated upon an increase in pressure in the straight air pipe for supplying fluid to the straight air train line, of a trailer brake equipment comprising a brake cylinder and a valve device operated upon an increase in pressure in the straight air train line for supplying fluid to the trailer brake cylinder.

In testimony whereof I have hereunto set my hand.

LLOYD V. LEWIS.